United States Patent
Wang et al.

(10) Patent No.: US 8,200,705 B2
(45) Date of Patent: Jun. 12, 2012

(54) METHOD AND APPARATUS FOR APPLYING DATABASE PARTITIONING IN A MULTI-TENANCY SCENARIO

(75) Inventors: Zhi Hu Wang, Haidian District (CN); Chang Jie Guo, Haidian District (CN); Wei Sun, Haidian District (CN); Wen Hao An, Haidian District (CN); Bo Gao, Haidian District (CN); Chen Wang, Haidian District (CN); Zhen Zhang, Haidian District (CN)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 12/509,051

(22) Filed: Jul. 24, 2009

(65) Prior Publication Data
US 2010/0030995 A1  Feb. 4, 2010

(30) Foreign Application Priority Data
Jul. 30, 2008  (CN) .......................... 2008 1 0134388

(51) Int. Cl.
G06F 17/30 (2006.01)
(52) U.S. Cl. ........................................ 707/796; 707/803
(58) Field of Classification Search .................. 707/796, 707/803
See application file for complete search history.

(56) References Cited

U.S. PATENT DOCUMENTS

| | | | |
|---|---|---|---|
| 7,069,434 B1 | 6/2006 | Ilnicki et al. | |
| 7,124,141 B2 * | 10/2006 | Norcott | 707/769 |
| 7,174,345 B2 * | 2/2007 | Malaney et al. | 707/800 |
| 2003/0163727 A1 * | 8/2003 | Hammons et al. | 713/201 |
| 2006/0173733 A1 * | 8/2006 | Fancher | 705/13 |
| 2008/0072309 A1 * | 3/2008 | Kleinsteiber et al. | 726/14 |
| 2008/0082540 A1 * | 4/2008 | Weissman et al. | 707/9 |
| 2008/0120275 A1 * | 5/2008 | Cruanes et al. | 707/2 |
| 2008/0211624 A1 * | 9/2008 | Micali et al. | 340/5.6 |
| 2009/0288084 A1 * | 11/2009 | Astete et al. | 718/1 |
| 2010/0138830 A1 * | 6/2010 | Astete et al. | 718/1 |
| 2010/0198730 A1 * | 8/2010 | Ahmed et al. | 705/50 |

OTHER PUBLICATIONS

Faruqui, F., "Introduction to Interprocess Communication Using Named Pipes," Jul. 2002, Introduction to Interprocess Communication Using Names Pipes, Sun Microsystems.
"Named Pipes," Team LiB, http://book.itzero.com/read/microsoft/0503/Addison.Wesley.Windows.System.Programm.

* cited by examiner

Primary Examiner — Don Wong
Assistant Examiner — Kim Nguyen
(74) Attorney, Agent, or Firm — Jeffrey N. Giunta; Fleit Gibbons Gutman Bongini & Bianco PL

(57) ABSTRACT

A method and apparatus for applying database partitioning in a multi-tenancy scenario is disclosed, the method includes providing, in each database table of a partitioned database system storing tenant data, a partition key field for storing a respective partition key for each tenant within a plurality of tenants. The respective partition key for each tenant is designated for each tenant according to a partition designated for the each respective tenant and the corresponding relationships between partitions and partition keys in the database partitioning mechanism of the partitioned database system. The respective partition key is used by the partitioned database system to perform database partitioning operations on the data of each respective tenant.

18 Claims, 12 Drawing Sheets

| Index value | 0 | 1 | 2 | 3 | 4 | ... | 4095 |
|---|---|---|---|---|---|---|---|
| Partition number | 0 | 1 | 0 | 1 | 0 | | 1 |

| Index value | 0 | 1 | 2 | 3 | 4 | ... | 4095 |
|---|---|---|---|---|---|---|---|
| Partition number | 0 | 1 | 2 | 3 | 0 | | 3 |

Fig. 3

METHOD AND APPARATUS FOR APPLYING DATABASE PARTITIONING IN A MULTI-TENANCY SCENARIO

CROSS-REFERENCE TO RELATED APPLICATIONS

This application is based upon and claims priority from prior Chinese Patent Application No. 200810134388.9, filed on Jul. 30, 2008 the disclosure of which is hereby incorporated herein by reference in its entirety.

FIELD OF THE INVENTION

The present application generally relates to the field of data processing, and in particular to multi-tenancy technology. More particularly, the present invention relates to a method and apparatus for applying database partitioning in a multi-tenancy scenario.

BACKGROUND OF THE INVENTION

Multi-tenancy technology refers to architectures that allow a single instance of software to run on a server of a service provider, and the single instance provides services to a plurality of client organizations (i.e., tenants), such as a large number of small and medium-sized enterprises. The multi-tenancy technology differs from the traditional service providing technique in which multiple software instances or hardware systems are created on a server for different client organizations. In multi-tenancy technology, a software application is designed to virtually partition its data and configurations so as to enable each client organization to operate by using a customized virtual application instance. The multi-tenancy technology is attracting more and more attention since it can realize a huge economy of scale, reduce the cost of software usage of client organizations and increase the profits of a service provider.

In a multi-tenancy scenario, a single software application instance may support millions of tenants, and the number of tenants may vary at any moment. Therefore, in order to realize an economy of scale in a multi-tenancy scenario, the underlying database must adopt a scale-out method with some clustering technique.

Database partitioning is a commonly used database scaling out technique, which has been realized by database management systems like DB2, SQL Server, etc. It supports clustering a plurality of physical machines/partitions and provides a single database management view to an application. FIG. 1 schematically illustrates an architecture of database partitioning. As shown, a database is partitioned into a plurality of database partitions, and said plurality of database partitions can be located on different machines. Data in the database is actually stored in each of the database partitions, and the access to the database by an application will be routed to corresponding database partitions by the partitioning database system. Such an architecture is easily scaled out by adding new database partitions.

The database partitioning technique usually distributes different records in a database table to different database partitions according to the values of one or more fields in the database table. For example, information about the clients whose postcodes are less than 50000 is stored in a table of one partition, while information about the clients whose post codes are more than or equal to 50000 is stored in a table of another partition, and a view generated by the union of the two tables can provide information of all the clients to the application. The one or more fields for distributing records to different database partitions are referred to as partition keys.

In order to distribute data to different database partitions based on values of the partition key, such as time, region, post code, etc., as evenly as possible, the database partitioning technique usually adopts a method of hash partitioning, in which, hash values obtained from hashing the partition keys by a certain hash function will decide to which partitions the records belong. FIG. 2 shows an exemplary implementation of the hash partitioning method used in the database partitioning technique. As shown, a hashing function performs hash operations on a partition key to obtain a hash value within the range of, for example, 0-4095. A partition mapping table contains the corresponding relationship between each hash value and the corresponding partition, for example, one of the partitions 1-4. In this way, the records to which each partition key value belongs will be allocated to the corresponding partition through the hash operation and the partition mapping table. When a new partition is added, new mapping relationships between the partition key values and the respective partitions can be formed automatically by adding the partition number of the new partition to the partition mapping table.

When it is attempted to apply the database partitioning technique in a multi-tenancy scenario so as to realize the scaling out of the database, since accesses to data are usually limited to a tenant in a multi-tenancy scenario, and cross-tenant data access is uncommon, the partitions should be assigned according to tenants, that is, data of the same tenant is only stored in one partition, though the same partition can be used to store the data of a plurality of tenants. Since different tenants are distinguished according to the tenant IDs in a multi-tenancy scenario, a natural practice is to use the tenant IDs as the partition key. In this way, the corresponding partitions for storing the data of different tenants can be determined conveniently by hashing the different tenant IDs and using the partition table.

However, the problem of "availability" may arise from such a practice. That is, when a new machine/partition is added to the current database cluster, the current corresponding relationships between hash values and partition numbers in the partition table may change automatically due to the addition of the new partition number. Therefore, the partitioned database system needs to re-distribute the data of the current tenants, which requires a very long down-time. FIG. 3 illustrates that the data of the current tenants needs to be re-distributed when a new partition is added in the case where tenant IDs are used directly as the partition key. As shown, in the current technique using tenant IDs as the partition key, the system will use the hash function to convert the value of a tenant ID into one of the 0-4095 hash values. The hash value will correspond to a partition number through the partition mapping table. For example, when the partitioned database system has 2 partitions, the corresponding relationships between the hash values and the partition number are as shown in the upper table of FIG. 3, wherein, when the hash value to which a tenant ID corresponds is 2, its corresponding partition number is 0. When the system is newly added with two partitions, the corresponding relationships between the hash values and the partition numbers of the system are automatically modified as shown in the lower table of FIG. 3. In this way, when a hash value to which a tenant ID corresponds is 2, the corresponding partition number will become 2. That is to say, since two partitions are newly added, the data corresponding to this tenant ID needs to be migrated from the partition 0 to the partition 2, and other tenants will encounter the similar problem and need to be migrated.

During the down-time for migrating the tenant data, all the tenants are unable to access their data. Therefore, the unavailable time of each tenant equals to the down-time of the partitioned database system, which may be several hours or even tens of hours, and will increase together with the increase of the number of the tenants or the amount of data records. FIG. 4 shows the situation where the system down-time increases together with the increase of the number of the tenants when the tenant IDs are used as the partition key directly. Such a situation is unacceptable.

Obviously, a solution for applying the database partitioning technique in a multi-tenancy scenario is needed in the art, which solution can make use of the current database partitioning technique to realize the distribution of the data of respective tenants into different partitions, so as to facilitate the scaling out of partitions, and at the same time will not bring about the availability problem when scaling out partitions.

SUMMARY OF THE INVENTION

In an aspect of the present invention, there is provided a method for applying database partitioning in a multi-tenancy scenario. The method includes providing, in each database table of a partitioned database system storing tenant data, a partition key field for storing a respective partition key for each tenant within a plurality of tenants. The respective partition key for each tenant is designated for each tenant according to a partition designated for the each respective tenant and the corresponding relationships between partitions and partition keys in the database partitioning mechanism of the partitioned database system. The respective partition key is used by the partitioned database system to perform database partitioning operations on the data of each respective tenant.

In another aspect of the present invention, there is provided an apparatus for applying database partitioning in a multi-tenancy scenario. The apparatus includes a partitioned database system for storing tenant data. Each database table in the partitioned database system has a partition key field for storing the partition key for each tenant. The partition key for each tenant is designated for the tenant according to the partition designated for the tenant and the corresponding relationships between partitions and partition keys in the database partitioning mechanism of the partitioned database system, and is used by the partitioned database system to perform database partitioning operations on the data of the tenant.

The present invention realizes the scaling out of the multi-tenant data storage with the existing database partitioning mechanism, and at the same time avoids the availability problem aroused when adding new partitions in case of simply using tenant IDs as the partition key.

BRIEF DESCRIPTION OF THE DRAWINGS

The appended claims set forth the inventive features which are considered characteristic of the present invention. However, the invention itself and its preferred embodiments, additional objects, features and advantages will be better understood by referring to the detailed description of the exemplary embodiments when read in conjunction with the attached drawings, in which:

FIG. 3 shows exemplarily that the data of the current tenants needs to be re-distributed when new partitions are added in case of using the tenant IDs as the partition key directly;

DETAILED DESCRIPTION OF EXEMPLARY EMBODIMENTS

The embodiments of the present invention will now be described with reference to the accompanying drawings. In the following description, numerous details are described to enable the present invention to be fully understood. However, it is obvious to those skilled in the art that the realization of the present invention can be without some of these details. In addition, it should be appreciated that the present invention is not limited to the described specific embodiments. In contrast, it is contemplated to implement the present invention by using any combination of the following features and elements, no matter whether they involve to different embodiments or not. Therefore, the following aspects, features, embodiments and advantages are only illustrative, rather than elements or limitations of the appended claims, unless explicitly stated otherwise in the claims.

Figure 1:
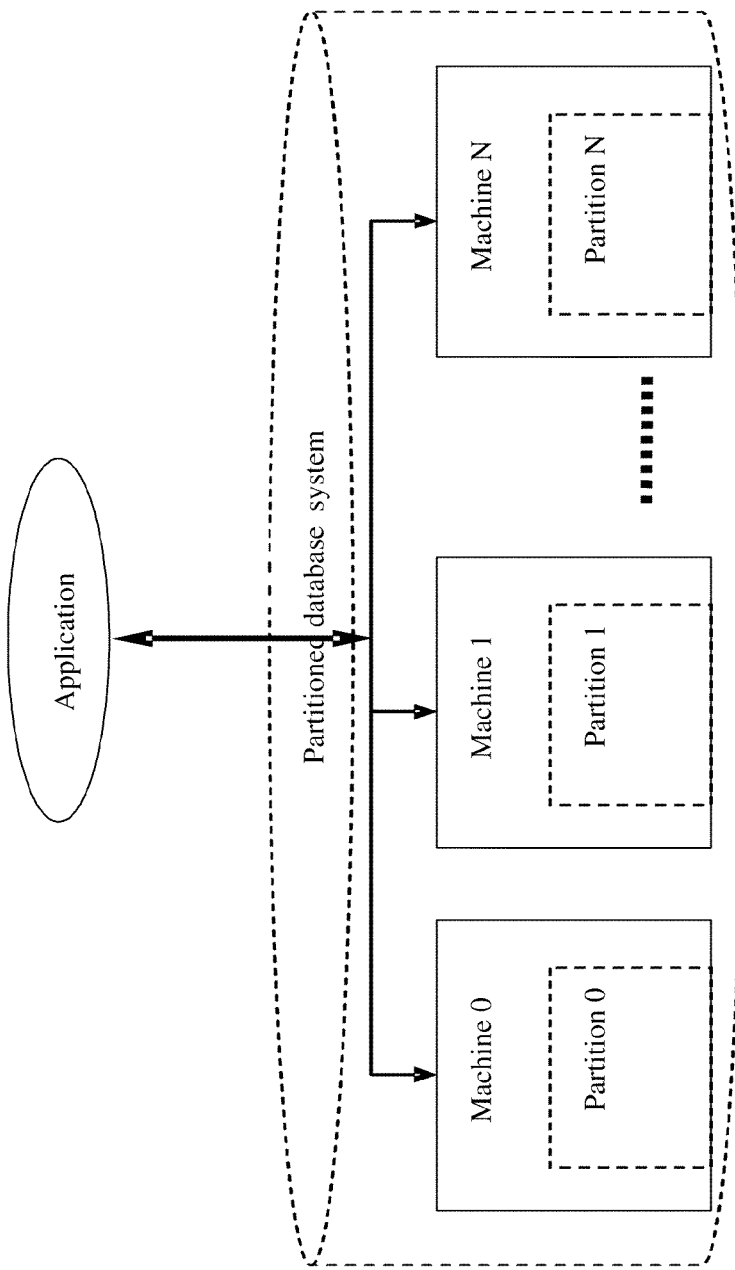
FIG. 1 schematically illustrates the architecture of the database partitioning.
Figure 2:
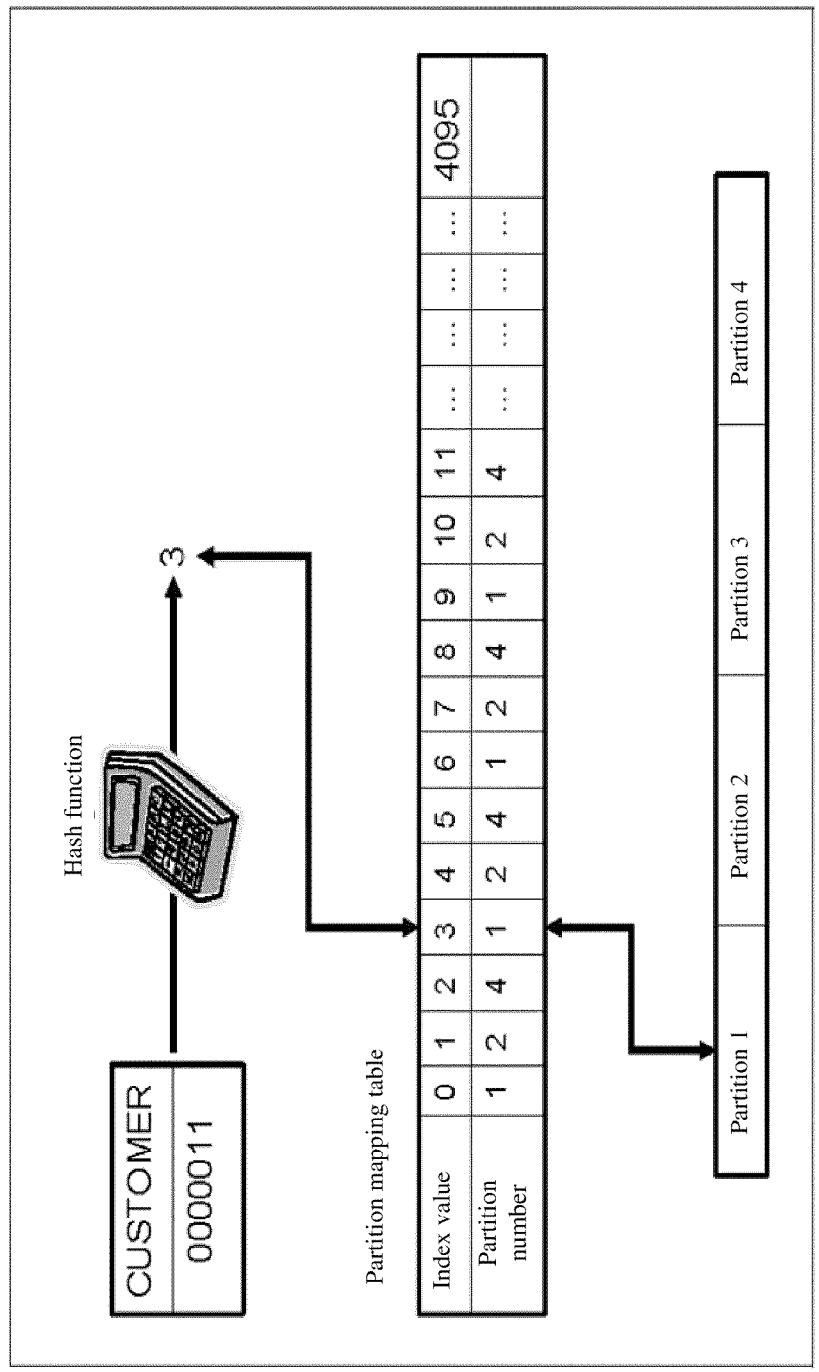
FIG. 2 illustrates an exemplary implementation of the hash partitioning method used in the database partitioning technique.
Figure 4:
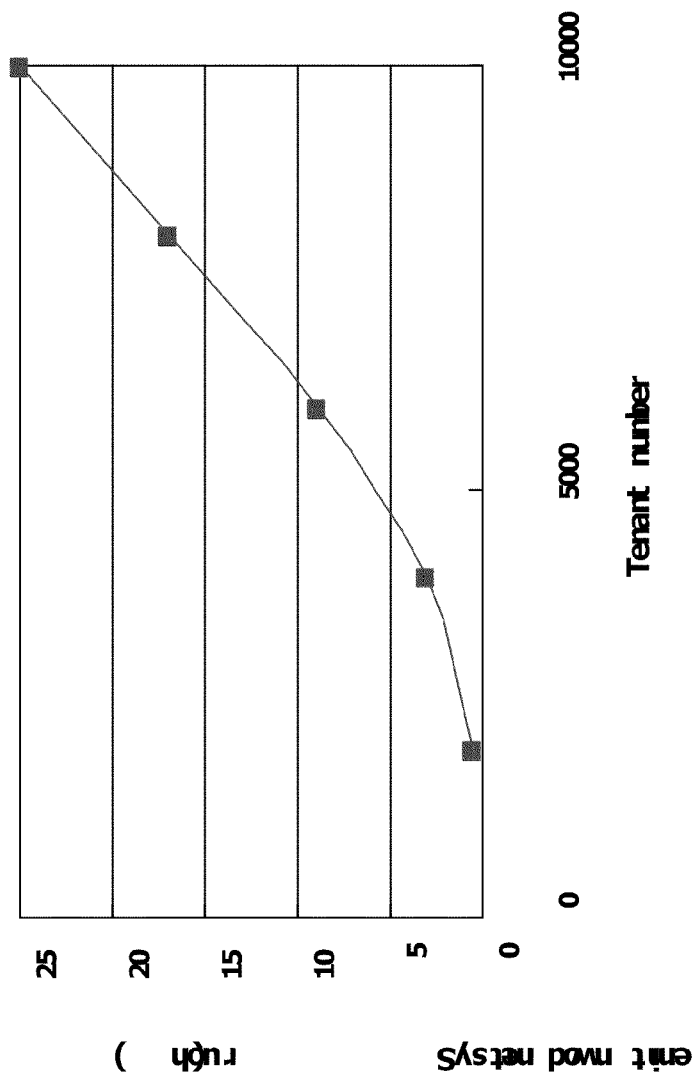
FIG. 4 shows the situation where the system down-time increases together with the increase of the number of the tenants in case of using the tenant IDs as the partition key directly.
Figure 5:
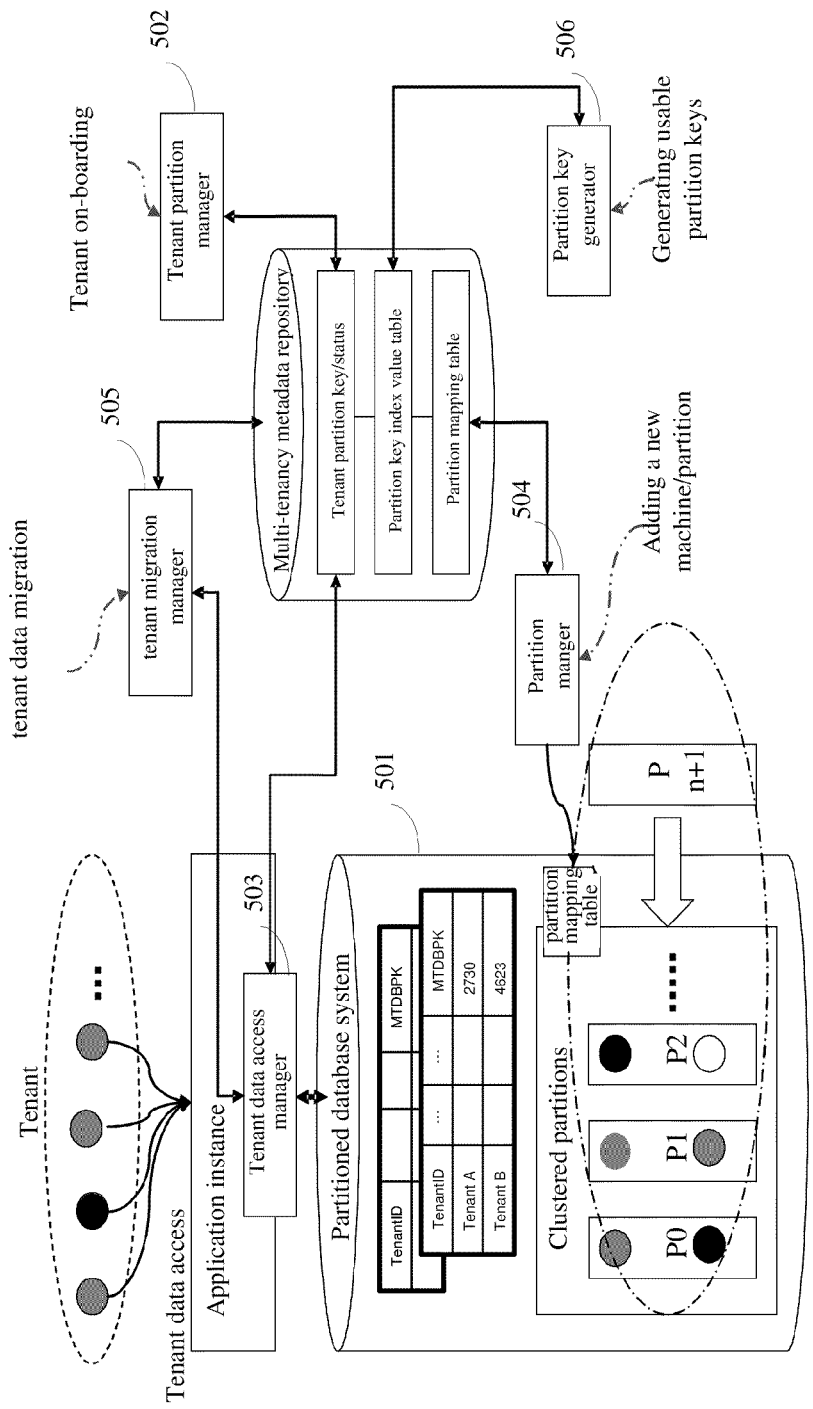
FIG. 5 shows an apparatus for applying database partitioning in a multi-tenancy scenario according to an embodiment of the present invention.

FIG. 5 shows an apparatus for applying database partitioning in a multi-tenancy scenario according to an embodiment of the present invention. As shown in the drawing, the apparatus for applying database partitioning in a multi-tenancy scenario comprises: a partitioned database system 501 for storing tenant data, wherein each database table in the partitioned database system 501 has a partition key field for storing the partition key for each tenant, wherein the partition key of each tenant is designated for the tenant according to the partition designated for the tenant and the corresponding relationships between partitions and partition keys in the database partitioning mechanism of the partitioned database system 501, and is used by the partitioned database system 501 to perform database partitioning operations on the data of the tenant.

That is to say, different from the practice of using the original one or more fields (e.g., tenant IDs) in the database table as the partition key in the prior art, in an embodiment of the present invention, an additional partition key field (namely, MTDBPK field shown in FIG. 5) is provided in each database table for storing the partition key for each tenant, and the partition key for each tenant is not from the original data of the tenant, rather, it is designated according to the partition assigned to the tenant and the corresponding relationships between partitions and partition keys in the database partitioning mechanism. The partition key will be used by the partitioned database system 501 to perform database partitioning operations on the data of the tenant, for example, when receiving a data access request from the tenant, using the partition key of the tenant to route the data access request to a corresponding database partition.

According to an embodiment of the present invention, the corresponding relationships between partitions and partition keys in the database partitioning mechanism are determined by a hash algorithm which uses the partition keys as input and index values as the output, and a partition mapping table containing the corresponding relationships between the index values and partition numbers.

Figure 6:
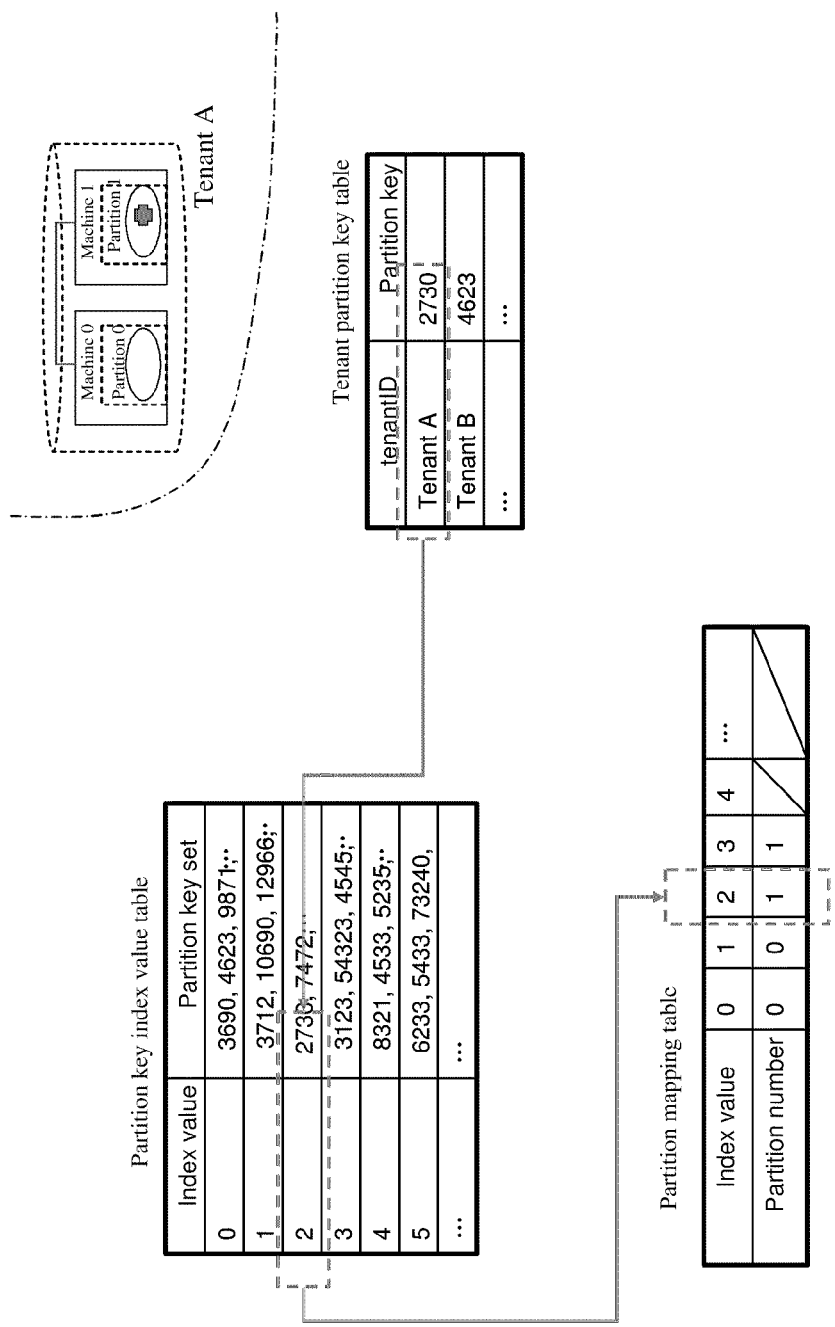
FIG. 6 shows exemplarily a mechanism of designating partition keys for tenants by making use of the database partitioning mechanism according to an embodiment of the present invention.

FIG. 6 shows a mechanism for designating partitions keys for tenants by using the database partitioning mechanism according to an embodiment of the present invention. As shown, there are two partitions in the partitioned database system 501, of which the partition numbers are 0 and 1, respectively. Firstly, a partition is assigned to a tenant according to a certain policy, for example, assigning a partition with partition number 1 to tenant A. Secondly, an index value for the tenant is determined in accordance with the corresponding relationships between index values (that is, the hash values) and partition numbers in the partition mapping table. For example, an index value "2" for tenant A is determined according to the corresponding relationship between the index value 2 and the partition number 1 in the partition mapping table. Then the tenant is assigned with such a partition key which enables the hash value obtained through hashing thereon by the hash function in the database partitioning mechanism to be equal to the index value having been determined for the tenant. For example, the partition key determined for tenant A can be "2730", since the hash value obtained through hashing on "2730" by the hash function is 2. Of course, since there can be a plurality of partition keys which have the same one hash value, any of the plurality of partition keys can be assigned for a tenant. In addition, each tenant can be designated with different partition keys, or a plurality of the tenants can be designated with a same partition key. Since different tenants can be distinguished by the tenant IDs, designating a same one partition key for a plurality of tenants will not cause confusion among data of the different tenants.

As shown in FIG. 6, according to a further embodiment of the present invention, the corresponding relationship between each tenant and the partition key designated for each tenant can be stored in a tenant partition key table, and the table can be stored, e.g., in a multi-tenancy metadata repository, to be used for later performing corresponding partition operations on the tenant data.

As shown in FIG. 6, according to a further embodiment of the present invention, the corresponding relationships between the set of possible partition keys and the corresponding index values can be pre-stored in a partition key index value table, and the table can be stored, e.g., in the multi-tenancy metadata repository. In this way, according to an index value that has been determined for a tenant using the partition mapping table, a partition key that can be used for the tenant can be found conveniently through the partition key index value table.

According to a further embodiment of the present invention, the apparatus for applying database partitioning in a multi-tenancy scenario further comprises a partition key generator 506 configured to pre-create the partition key index value table, that is, pre-creating a group of mapping pairs of partition key sets and index values. The partition key generator 506 can create the mapping pairs of partition key set and the index value by using the same hash algorithm as used in the hash function in the database partitioning mechanism.

Since in the present invention, as described above, a tenant is first designated with a partition, and then the tenant is designated with a partition key (the partition key is used by the partitioned database system 501 to perform corresponding partition operations, e.g., routing a data access request of the tenant to the corresponding partition) according to the partition designated for the tenant, rather than the common practice in the prior art, that is, using the original one or more fields (e.g., the tenant ID) in the tenant data as the partition key and determining the partition to which the tenant belongs and on which the tenant's data access requests are to be routed according to the partition key, when new partitions are added to the partitioned database system 501, the corresponding relationships between the original tenants and the partitions will not be changed automatically by the database partitioning mechanism, and thus there is no need to migrate immediately the data of all the tenants whose partitions have been changed after a new partition is added. On the contrary, the migration of tenants' data can be done when a tenant is designated with a new partition, and partition by partition rather than collectively. In this way, when data of a tenant is migrated, data of the other tenants can still be accessed, thereby solving the availability problem occurring when adding new partitions in the prior art.

Figure 7:
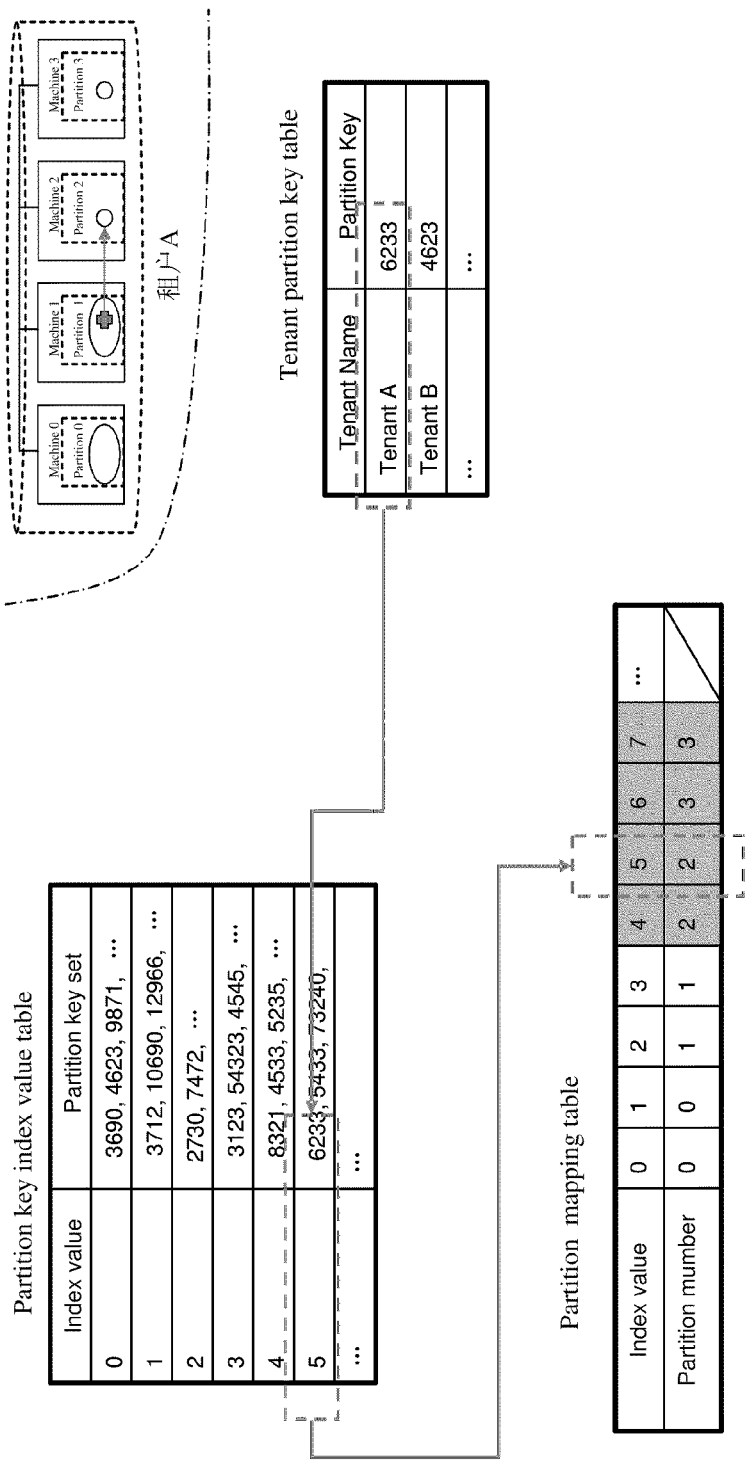
FIG. 7 shows exemplarily a mechanism of adding new partitions to the partitioned database system according to an embodiment of the present invention.

FIG. 7 exemplarily shows the mechanism of adding new partitions to the partitioned database system 501 according to an embodiment of the present invention, wherein it is not necessary to modify the current corresponding relationships between tenants and partitions when new partitions are added. Moreover, the corresponding relationship between a tenant and a partition needs to be changed only when it is determined that the data of the tenant needs to be migrated. Referring to FIG. 6, the partitioned database system 501 has two partitions initially, partition 0 and partition 1, and tenant A is assigned with partition 1 and the partition key designated for tenant A is 2730 correspondingly. Referring to FIG. 7, the partitioned database system 501 is added with two new partitions, partition 2 and partition 3. The partition numbers of the new partitions will be added to free columns of the partition mapping table, and correspond to the new index values 4, 5 and 6, 7 respectively. And the corresponding relationships between the original index values 0, 1, 2, 3 and the partition numbers 0, 1 do not change due to the newly added partition numbers. This means, when the two new partitions are added to the partitioned database, the data of the current tenants, e.g., tenant A, is not necessarily migrated from partition 1 to other partitions, e.g., the new partition 2. Thereafter, when tenant A is assigned with a new partition 2 according to a certain policy, e.g., a load balancing policy, thus needing to migrate the data of tenant A from partition 1 to partition 2, the index value 5 to which partition 2 corresponds can be found according to the partition mapping table, and a new available partition key 6233 can be found according to the partition key index value table, and then the new available partition key can be designated for tenant A. In this way, the partition key field of each record of tenant A in a current database table can be modified by the partitioned database system 501 to make the value of the field be equal to the new partition key 6233, so as to make the partitioned database system 501 accomplish the data migration of tenant A automatically.

According to an embodiment of the present invention, the apparatus for applying database partitioning in a multi-tenancy scenario further comprises a tenant partition manger 502 configured to execute a new tenant on boarding process, which comprises: in response to a tenant's on boarding, designating a partition for the tenant; determining a partition key associated with the designated partition according to the corresponding relationships between partitions and partition keys in the database partitioning mechanism; and storing the corresponding relationship between the tenant and the partition key, e.g., storing it in a multi-tenancy metadata repository.

The designating a partition for the tenant is preferably performed according to a policy, e.g., a load balancing policy or a round robin policy, etc. And as described above, in an embodiment of the present invention, the determining a partition key associated with the designated partition is performed through the partition mapping table and the hash algorithm or the partition key index value table.

According to an embodiment of the present invention, the apparatus for applying database partitioning in a multi-tenancy scenario further comprises a tenant data access manager 503 configured to execute a tenant data access process, which comprises the following operations: in response to receiving a data access request from a tenancy, obtaining the partition key and data access status of the tenant; in response to determining that the data access status is not "suspended", modifying the SQL statement in the data access request to add the partition key for the tenant e.g., adding the partition key into the where clause in the SQL statement; and invoking the partitioned database system 501 to execute the modified SQL statement so as to route the data access request to the corresponding partitions.

The data access status of each tenant is preferably stored in a multi-tenancy metadata repository and changes dynamically according to the data access status of each tenant. For example, as described below, when data migration is performed on the data of a tenant, the data access status of the tenant is modified into a first status, such as "suspended"; and when the data migration of the tenant finishes, the data access status of the tenant is restored into a second status, such as "run", etc.

According to an embodiment of the present invention, the apparatus for applying database partitioning in a multi-tenancy scenario further comprises a partition manager 504 configured to execute a process of adding a new database partition, which comprises: stopping the partitioned database system 501 when a new database partitions needs to be added; adding the partition number of the new database partition to the partition mapping table without changing the corresponding relationships between the current index values and the partition numbers in the partition mapping table; and restarting the database system using the mapping table with the new partition number added. Of course, the partition manager 504 can also be configured to execute the process of removing a database partition, which may comprise: modifying the partition mapping table to delete the partition number of the database partition that needs to be removed; and migrating the tenant data contained in the database partition to another partition.

According to an embodiment of the present invention, the apparatus for applying database partitioning in a multi-tenancy scenario further comprises a tenant migration manager 505, wherein, the tenant partition manger 502 is configured, in response to determining the data of a tenant in a partition needs to be migrated, to designate a new partition for the tenant, and invoking the tenant migration manager 505; the tenant migration manager 505 is configured to execute a data migration process, which comprises: invoking the tenant data access manager 503 to modify the data access status of the tenant into a first status such as "suspended"; determining a new partition key for the tenant according to the corresponding relationships between partitions and partition keys in the database partitioning mechanism and the designated new partition; initiating a transaction to update the value of the partition key field of the data records of the tenant in each database table of the partitioned database system 501 to the new partition key so as to migrate the data of the tenant to the new partition automatically by the partitioned database system 501; storing the corresponding relationship between the tenant and the new partition key in the multi-tenancy metadata repository in response to the successful completion of the transaction; and invoking the tenant data access manager 503 to modify the data access status of the tenant into a second status, such as "run".

Therein, designating a new partition for the tenant is performed preferably according to a load balancing policy. In an embodiment of the present invention, the data access status of each tenant is stored in a multi-tenancy metadata repository. In an embodiment of the present invention, the corresponding relationships between partitions and partition keys in the database partitioning mechanism are determined by the partition mapping table and the hash algorithm or the partition key index value table described previously.

Above is described the apparatus for applying database partitioning in a multi-tenancy scenario according to an embodiment of the present invention. It should be pointed out that, the above description is only exemplary, rather than limitation to the apparatus of the present invention. The apparatus of the present invention can have more, less or different elements as compared with the described and illustrated apparatus, and the connection and containment relationships among the components can be different from the described and illustrated ones. For example, in other embodiments of the present invention, the partition mapping table can have a structure different from the illustrated and described one, or the corresponding relationships between partition keys and partitions may be determined by other mechanisms, rather than being determined by the partition key index value table or the hash function and the partition mapping table. As another example, in some embodiments of the present invention, one or more of the components can be not included in the apparatus for applying database partitioning in a multi-tenancy scenario, or part of or all of the functions of some components can be executed by other components, and so on.

The following is to describe a method for applying database partitioning in a multi-tenancy scenario according to an embodiment of the present invention. The method can be executed by the apparatus for applying database partitioning in a multi-tenancy scenario according to the embodiments of the present invention as described above. For brevity, part of the details redundant to the above description is omitted from the following description.

Figure 8:
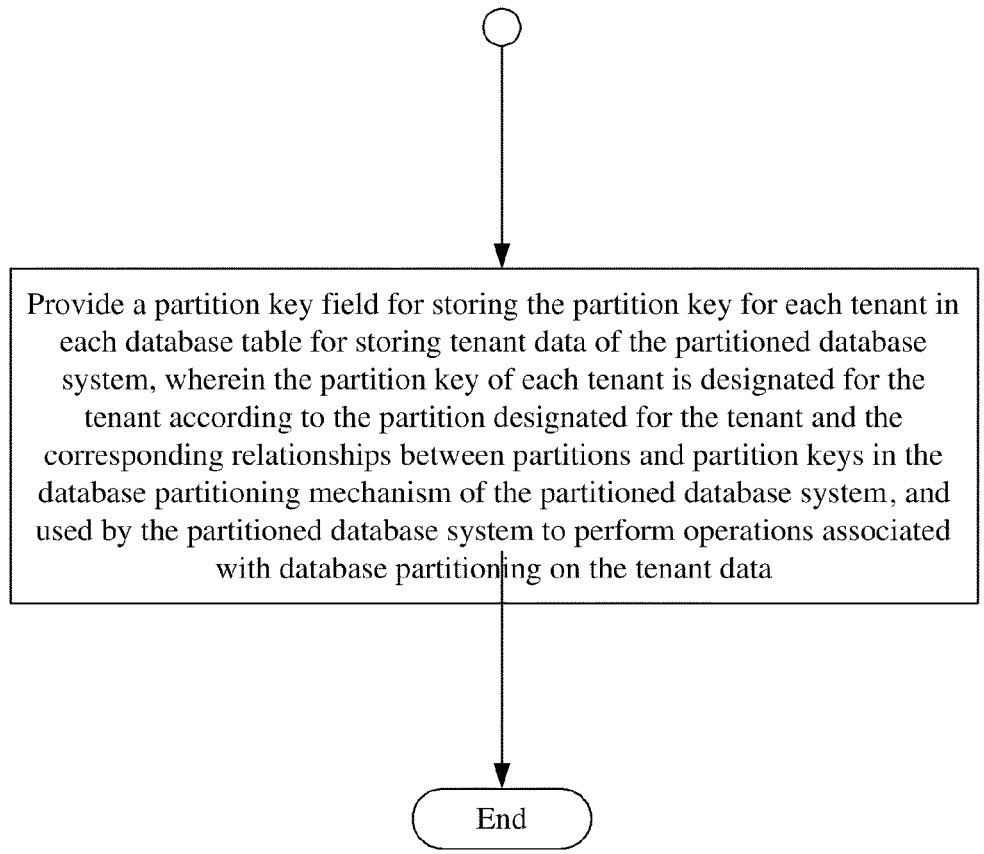
FIG. 8 shows a method for applying database partitioning in a multi-tenancy scenario according to an embodiment of the present invention.

FIG. 8 shows a method for applying database partitioning in a multi-tenancy scenario according to an embodiment of the present invention. As shown, the method comprises: providing a partition key field for storing a partition key of each tenant in each database table in a partitioned database system 501 for storing tenant data, wherein the partition key of each tenant is designated for the tenant according to the partition designated for the tenant and the corresponding relationships between partitions and partition keys in the partitioned database system 51, and used by the partitioned database system 501 to perform database partitioning operations on the data of the tenant.

According to an embodiment of the present invention, the corresponding relationships between partitions and the partition keys in the database partitioning mechanism are determined based on a hashing algorithm taking a partition key as input and an index value as output and a partition mapping table containing the corresponding relationships between index values and partition numbers.

According to an embodiment of the present invention, the method for applying database partitioning in a multi-tenancy scenario further comprises generating in advance available partition keys and corresponding index values, and storing the partition keys and the corresponding index values in the partition key index value table described above, for example, in a multi-tenancy metadata repository, and the corresponding relationships between partitions and partition keys in the database partitioning mechanism are determined based on the partition key index value table and the partition mapping table. That is, an available partition key can be designated for the tenant according to the partition key index value table and the mapping table and the partition designated for the tenants.

Figure 9:
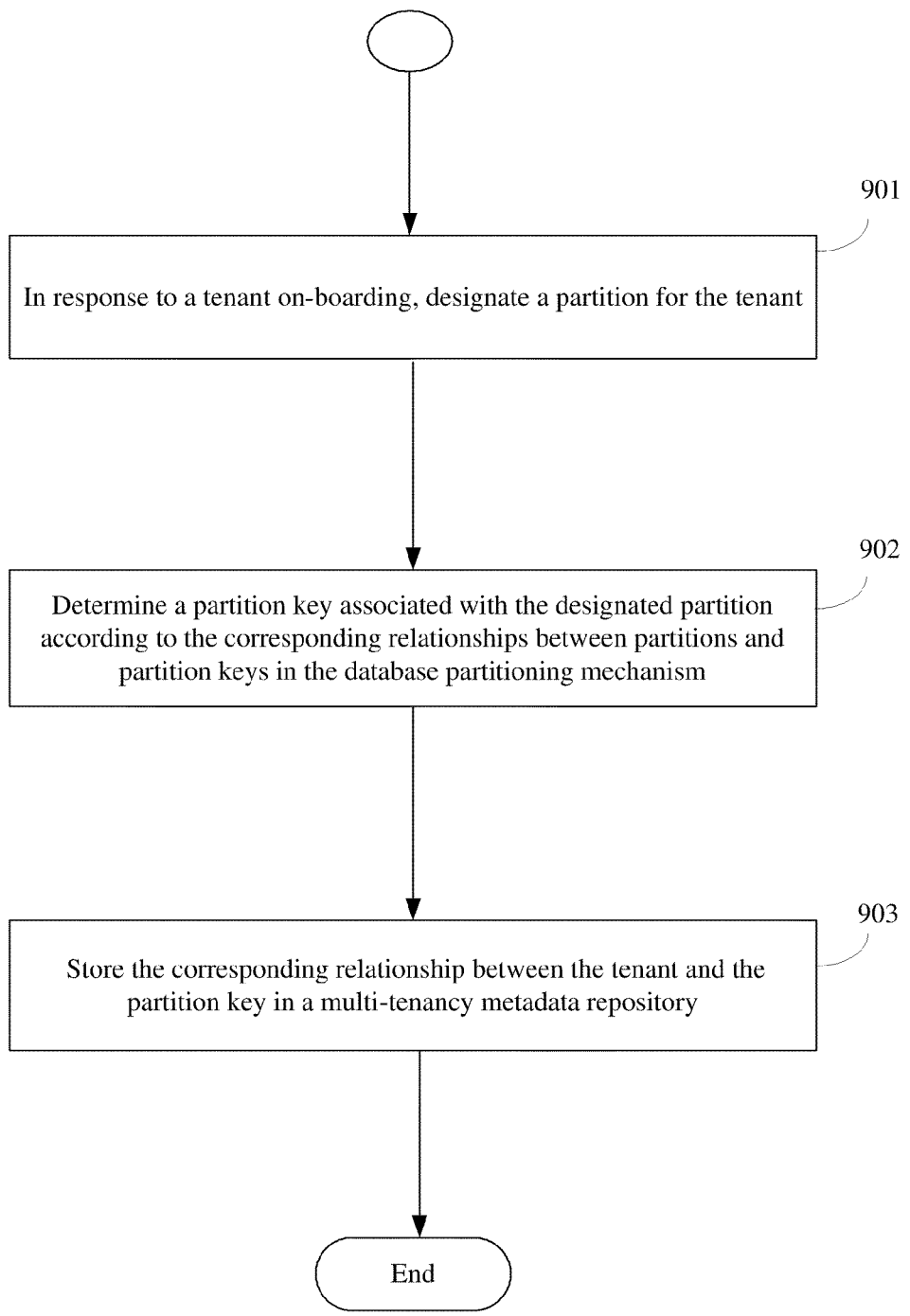
FIG. 9 shows a process of a new tenant on-boarding according to an embodiment of the present invention.

According to an embodiment of the present invention, the method for applying database partitioning in a multi-tenant scenario further comprises a new tenant on-boarding process, which is preferably executed by the tenant partition manager 502 in the apparatus for applying database partitioning in a multi-tenancy scenario as described above. Referring to FIG. 9, it shows a new tenant's on boarding process according to an embodiment of the present invention.

As shown, in step 901, a partition is designated for a new tenant in response to the new tenant's on boarding. According to an embodiment of the present invention, the partition is designated for the new tenant according to a load balancing policy or a round robin policy.

In step 902, a partition key associated with the designated partition is determined according to the corresponding relationships between partitions and partition keys in the database partitioning mechanism.

In step 903, the corresponding relationship between the tenant and the partition key is stored in a multi-tenancy metadata repository.

Figure 10:
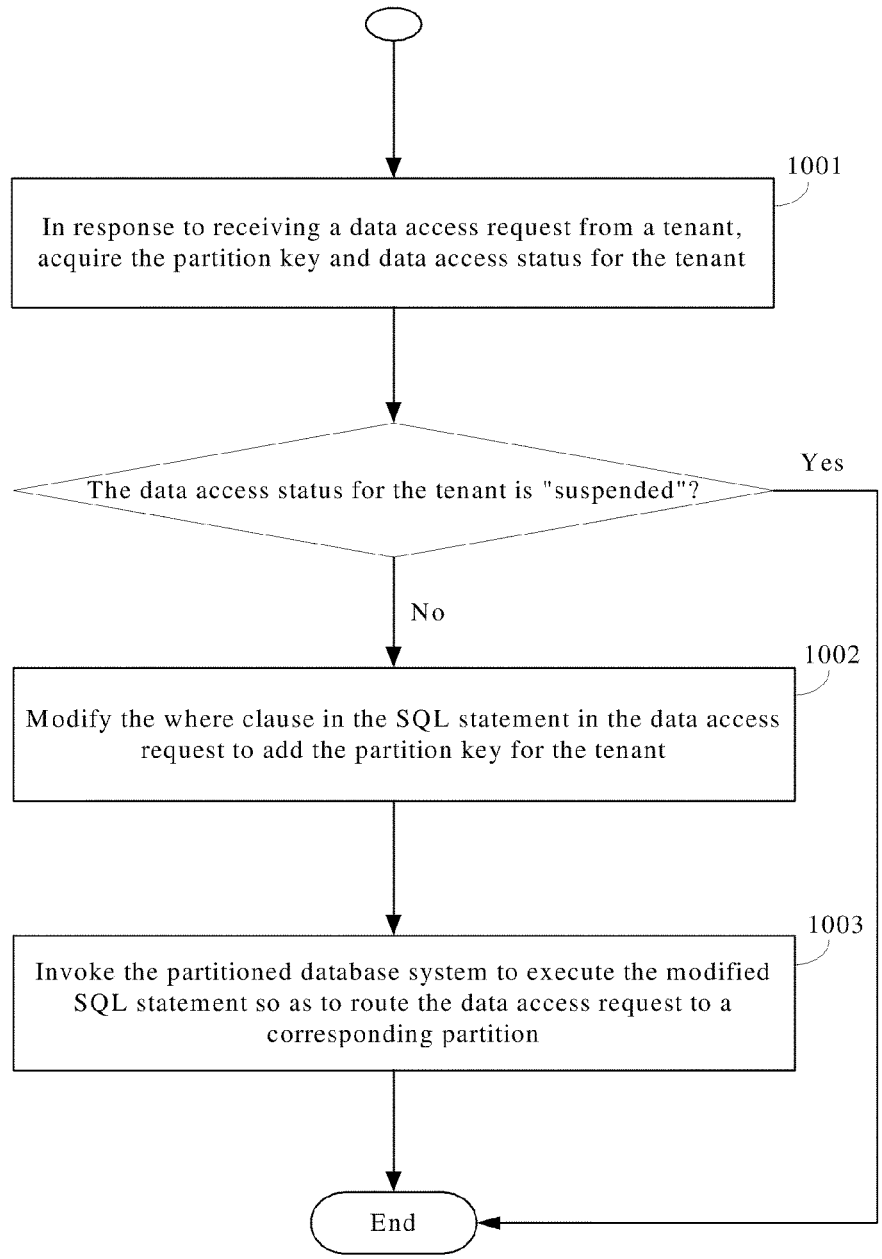
FIG. 10 shows a process of accessing tenant data according to an embodiment of the present invention.

According to an embodiment of the present invention, the method for applying database partitioning in a multi-tenancy scenario further comprises a tenant data access process. The process preferably is executed by the tenant data access manager 503 in the apparatus for applying database partitioning in a multi-tenancy scenario as described above. Referring to FIG. 10, it shows the tenant data access process according to an embodiments of the present invention.

As shown, in step 1001, in response to receiving a data access request from a tenant, the partition key and the data access status for the tenant are acquired.

In step 1002, in response to determining that the data access status for the tenant is not "suspended", the SQL statement in the data access request is modified with the partition key for the tenant being added, e.g., the partition key being added into the where clause in the SQL statement.

In step 1003, the partitioned database system 501 is invoked to execute the modified SQL statement so as to route the data access request to a corresponding partition.

Figure 11:
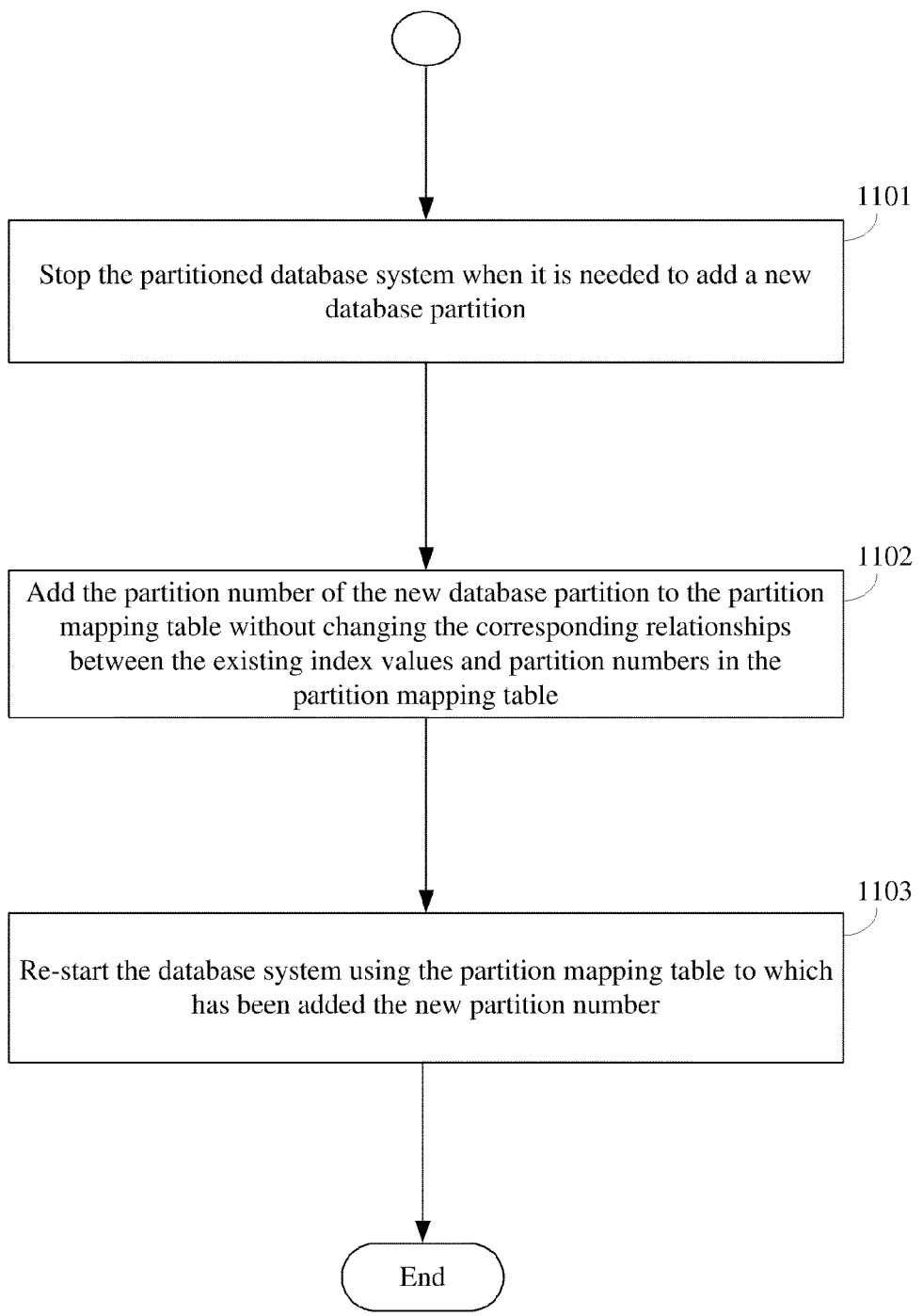
FIG. 11 shows a process of adding a new partition according to an embodiment of the present invention.

According to an embodiment of the present invention, the method for applying database partitioning in a multi-tenancy scenario further comprises a process for adding a new partition. The process is preferably executed by the partition manager 504 in the apparatus for applying database partitioning in a multi-tenancy scenario described above. Referring to FIG. 11, it shows the process of adding a new partition according to an embodiment of the present invention.

As shown, in step 1101, when it needs to add a new database partition, the partitioned database system 501 is stopped.

In step 1102, the partition number of the new database partition is added to the partition mapping table, without changing the corresponding relationships between the existing index values and the partition numbers in the partition mapping table.

In step 1103, the database system is re-started using the partition mapping table to which has been added the new partition number.

According to an embodiment of the present invention, the method for applying database partitioning in a multi-tenancy scenario further comprises a process of tenant data migration. The process is preferably executed by the tenant migration manager 505 in the apparatus for applying database partitioning in a multi-tenancy scenario as described above. It is not necessary to perform the tenant data migration process immediately after adding a new partition in the partition managers; rather, it can be performed at any time, for example, when it is needed to perform load balancing on the tenant data in partitions to improve data access performance. The process can either be initiated by a user manually, or be initiated automatically, for example, initiated automatically by some load balancing mechanism based on the loads of current partitions and the characteristics and behavior of tenants. In addition, the process can be used to perform data migration for a single tenant at one time, or to perform data migration for a plurality of tenants at one time.

Figure 12:
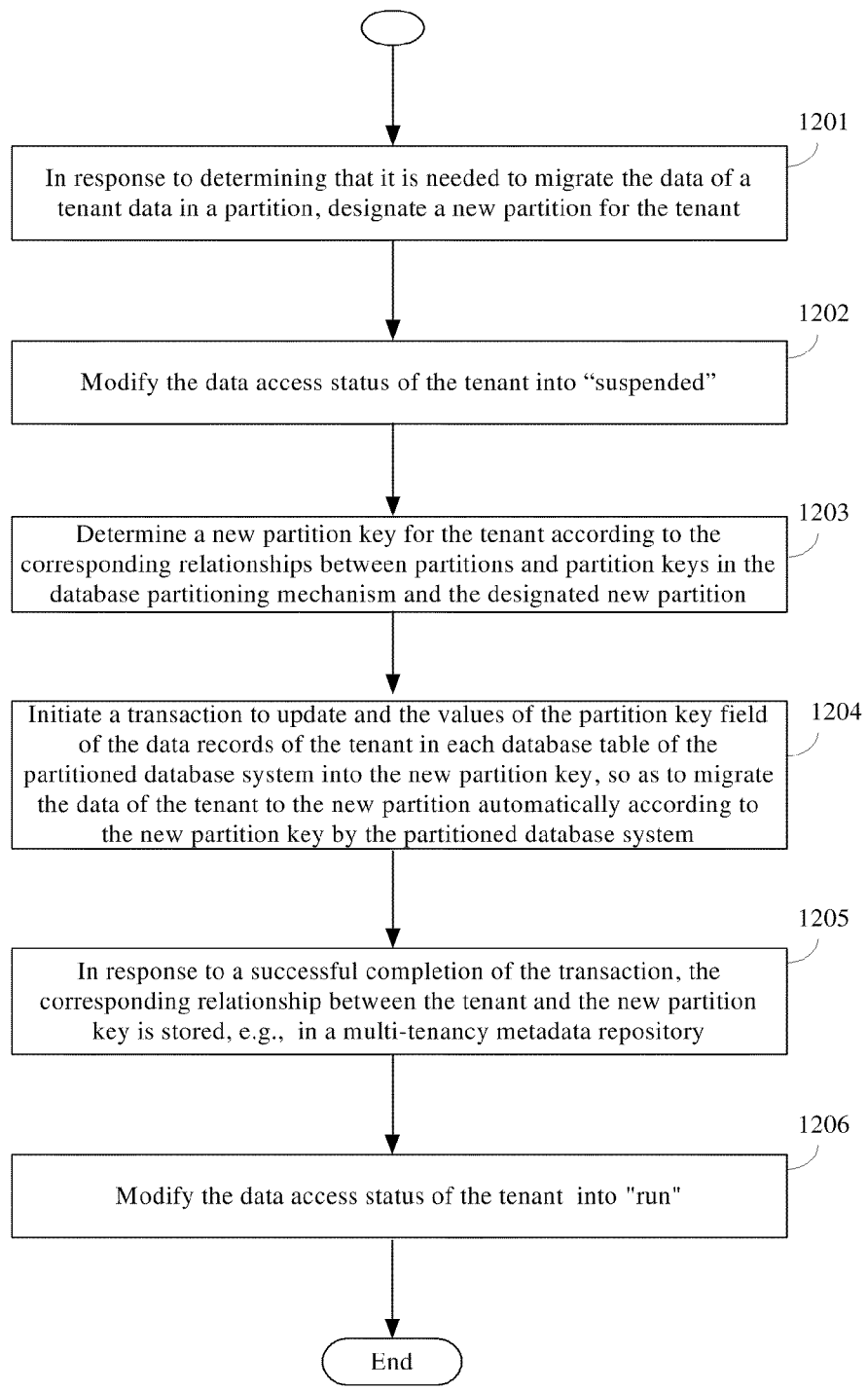
FIG. 12 shows a process of migrating tenant data according to an embodiment of the present invention.

Referring to FIG. 12, it shows the process of tenant data migration according to an embodiment of the present invention.

As shown, in step 1201, a new partition is designated for a tenant in response to determining that it is needed to migrate the data of the tenant in a partition. According to the embodiments of the present invention, designating a new partition for the tenant is performed according to a load balancing policy.

In step 1202, the data access status of the tenant is modified into "suspended".

In step 1203, a new partition key for the tenant is designated according to the corresponding relationships between partitions and partition keys in the database partitioning mechanism and the designated new partition.

In step 1204, a transaction is initiated, to update the value of the partition key field of the data records of the tenant in each database table of the partitioned database system 501 into the new partition key, so as to migrate the data of the tenant to the new partition automatically according to the new partition key by the partitioned database system 501.

In step 1205, in response to a successful completion of the transaction, the corresponding relationship between the tenant and the new partition key is stored, e.g., in a multi-tenancy metadata repository.

In step 1206, the data access status of the tenant is modified into "run".

The above is described a method for applying database partitioning in a multi-tenancy scenario according to an embodiment of the present invention with reference to the drawings. It should be pointed out that, the above description is only exemplary, rather than limitation to the method of present invention. In other embodiments of the present invention, it is not necessary for the method for applying database partitioning in a multi-tenancy scenario to include the above one or more steps or processes, or include other different steps or processes. Moreover, the sequence between steps or processes can be different from that described and illustrated. As another example, although the data access statuses of a tenant are described above as including "suspended" and "run", additionally or alternatively, the data access statuses of a tenant can also include other statuses.

The present invention can be realized in hardware, software, or a combination thereof. The present invention can be realized in a computer system in a centralized manner, or in a distributed manner, in which, different components are distributed in some interconnected computer system. Any computer system or other devices suitable for executing the method described herein are appropriate. A typical combination of hardware and software can be a computer system with a computer program, which when being loaded and executed, controls the computer system to execute the method of the present invention, and constitute the apparatus of the present invention.

The present invention can also be embodied in a computer program product comprising computer program for realizing all the features of the method described herein which, when being loaded into a computer system, can execute the method steps.

Although a specific embodiment of the invention has been disclosed, it will be understood by those having skill in the art that various modifications and changes can be made without departing the spirit and scope of the present invention. The scope of the invention is not to be restricted, therefore, to the specific embodiment, and it is intended that the appended claims cover any and all such applications, modifications, and embodiments within the scope of the present invention.

The invention claimed is:

1. A method for applying database partitioning in a multi-tenancy scenario, comprising:
   providing, in each database table of a partitioned database system storing tenant data for a plurality of tenants, a partition key field for storing a respective partition key for each tenant within the plurality of tenants,
      wherein the partitioned database system stores data across a plurality of partitions,
      wherein each tenant is assigned to at least one respective partition, and
      wherein a subset plurality of tenants is assigned to one partition within the plurality of partitions, wherein the subset plurality of tenants is a subset of the plurality of tenants;
   maintaining a mapping between partition keys and partitions within the plurality of partitions, the mapping between partition keys and partitions indicating, for each tenant, the respective partition key and a respective partition designated to the each tenant according to corresponding relationships between partitions and partition keys in the database partitioning mechanism of the partitioned database system, wherein partition keys are different from identifiers of the respective partitions;
   in response to a new tenant on-boarding, designating a designated partition within the plurality of partitions, the designated partition being used to store data for the tenant;
   determining, in response to the designating, a new partition key associated with the designated partition according to the corresponding relationships between partitions and partition keys in the database partitioning mechanism;
   storing a corresponding relationship between the new tenant and the new partition key into the mapping; and
   performing database partitioning operations on the data of each respective tenant based upon the respective partition key and the mapping between partition keys and partitions.

2. The method of claim 1, further comprising:
   in response to receiving a data access request from a tenant, acquiring a partition key and data access status for the tenant and;
   in response to determining that the data access status for the tenant is not a first status, modifying the data access request to add the partition key for the tenant; and
   invoking the partitioned database system to execute the modified data access request so as to route the data access request to a corresponding partition.

3. The method of claim 1, further comprising:
   in response to determining that the data of a first tenant in a partition needs to be migrated, designating a new partition for the tenant;
   modifying the data access status of the first tenant into a first status;
   determining a new partition key for the first tenant according to the corresponding relationships between partitions and partition keys in the database partitioning mechanism and the designated new partition;
   initiating a transaction to update the value of the partition key field of the data records of the tenant in each database table of the partitioned database system into the new partition key so as to migrate the data of the tenant to the new partition automatically by the partitioned database system according to the new partition key;
   in response to a successful completion of the transaction, storing the corresponding relationship between the tenant and the new partition key into the mapping; and
   modifying the data access status for the tenant into a second status.

4. The method of claim 1, further comprising:
   determining a need to designate one of a partition and a new partition for a first tenant; and
   designating, in response to the determining, the one of the partition and the new partition for the first tenant according to a load balancing policy.

5. The method of claim 1,
   wherein the corresponding relationships between partitions and partition keys in the database partitioning mechanism are determined according to a hash algorithm which uses partition keys as input and index values as output,
   the corresponding relationships between partitions and partition keys further being determined according to a partition mapping table containing the corresponding relationships between the index values and partition numbers.

6. The method of claim 5, further comprising:
   generating in advance usable partition keys and corresponding index values according to the hash algorithm; and
   storing the usable partition keys and the corresponding index values in a partition key index value table, and
   wherein the corresponding relationships between partitions and partition keys in the database partitioning mechanism are determined based on the partition key index value table and the partition mapping table.

7. The method of claim 5, further comprising:
   stopping the partitioned database system when it is need to add a new database partition;
   adding the partition number of the new database partition to the partition mapping table, without changing the corresponding relationships between the existing index values and the partition numbers in the partition mapping table; and re-starting the new partitioned database system using the partition mapping table to which has been added the new partition number.

8. An apparatus for applying database partitioning in a multi-tenancy scenario, comprising:
a processor;
a memory coupled to the processor;
a partitioned database system coupled to the processor and configured to store tenant data for a plurality of tenants, wherein each database table in the partitioned database system has a partition key field for storing the partition key for each tenant within the plurality of tenants,
wherein the partitioned database system stores data across a plurality of partitions,
wherein each tenant is assigned to at least one respective partition, and
wherein a subset plurality of tenants is assigned to one partition within the plurality of partitions, wherein the subset plurality of tenants is a subset of the plurality of tenants; and
a multi-tenancy metadata repository coupled to the processor and configured to maintain a mapping between partition keys and partitions within the plurality of partitions, the mapping between partition keys and partitions indicating, for each tenant, the respective partition key and a respective partition designated to the each tenant according to corresponding relationships between partitions and partition keys in the database partitioning mechanism of the partitioned database system, wherein partition keys are different from identifiers of the respective partitions; and
a tenant partition manager which is configured to:
in response to a new tenant on-boarding, designate a partition within the plurality of partitions, the designated partition being used to store data for the new tenant;
determining a new partition key associated with the designated partition according to the corresponding relationships between partitions and partition keys in the database partitioning mechanism; and
storing a corresponding relationships between the new tenant and the partition key into the mapping, and
wherein the partitioned database system is further configured to perform database partitioning operations on the data of each respective tenant based upon the partition keys and the mapping between partition keys and partitions.

9. The apparatus of claim 8, further comprising a tenant data access manager which is configured to:
in response to receiving a data access request from a tenant, acquiring the partition key and data access status for the tenant;
in response to determining that the data access status of the tenant is not a first status, modify an SQL statement in the data access request to add the partition key for the tenant; and
invoke the partitioned database system to execute the modified SQL statement so as to route the data access request to a corresponding partition.

10. The apparatus of claim 8, further comprising a tenant migration manager, wherein the tenant partition manager is configured to, in response to determining that the data of a tenant in a partition needs to be migrated, designate a new partition for the tenant, and invoke the tenant migration manager;

the tenant migration manager is configured to:
invoke a tenant data access manager to modify the data access status of the tenant into a first status;
determine a new partition key for the tenant according to the corresponding relationships between partitions and partition keys in the database partitioning mechanism and the designated new partition;
initiate a transaction to update the value of the partition key field of the data records of the tenant in each database table of the partitioned database system into the new partition key so as to migrate the data of the tenant to the new partition automatically by the partitioned database system according to the new partition key;
in response to a successful completion of the transaction, store the corresponding relationship between the tenant and the new partition key in the multi-tenancy metadata repository; and
invoke the tenant data access manager to modify the data access status of the tenant into a second status.

11. The apparatus of claim 8, wherein the tenant partition manager is further configured to:
determine a need to designate one of a partition and a new partition for a first tenant; and
designate, in response to the determining, the one of the partition and the new partition for the first tenant according to a load balancing policy.

12. The apparatus of claim 8, wherein the corresponding relationships between partitions and partition keys in the database partitioning mechanism are determined by a hash algorithm which uses partition keys as input and index values as output, as well as a partition mapping table containing the corresponding relationships between the index values and partition numbers.

13. The apparatus of claim 12, further comprising a partition key generator which is configured to pre-generate usable partition keys and corresponding index values and store the usable partition keys and the corresponding index values in a partition key index value table, and the corresponding relationships between partitions and partition keys in the database partitioning mechanism are determined based on the partition key index value table and the partition mapping table.

14. The apparatus of claim 12, wherein the tenant partition manager is further configured to:
stop the partitioned database system when it is needed to add a new database partition;
add the partition number of the new database partition to the partition mapping table, without changing the corresponding relationships between the existing index values and the partition numbers in the partition mapping table; and
re-start the partitioned database system using the partition mapping table to which has been added the new partition number.

15. A computer program product comprising a non-transitory machine readable medium,
the machine readable medium being tangibly encoded with machine executable instructions to perform a method for applying database partitioning in a multi-tenancy scenario, the method comprising the steps of:
providing, in each database table of a partitioned database system storing tenant data for a plurality of tenants, a partition key field for storing a respective partition key for each tenant within the plurality of tenants,
wherein the partitioned database system stores data across a plurality of partitions, wherein each tenant is assigned to at least one respective partition, and wherein a subset plurality of tenants is assigned to one partition within the plurality of partitions, wherein the subset plurality of tenants is a subset of the plurality of tenants;

maintaining a mapping between partition keys and partitions within the plurality of partitions, the mapping between partition keys and partitions indicating, for each tenant, the respective partition key and a respective partition designated to the each tenant according to corresponding relationships between partitions and partition keys in the database partitioning mechanism of the partitioned database system, wherein partition keys are different from identifiers of the respective partitions;

in response to a new tenant on-boarding, designating a designated partition within the plurality of partitions, the designated partition being used to store data for the tenant;

determining, in response to the designating, a new partition key associated with the designated partition according to the corresponding relationships between partitions and partition keys in the database partitioning mechanism; and storing a corresponding relationship between the new tenant and the new partition key into the mapping; and performing database partitioning operations on the data of each respective tenant based upon the respective partition key and the mapping between partition keys and partitions.

16. The computer program product of claim 15, wherein the corresponding relationships between partitions and partition keys in the database partitioning mechanism are determined according to a hash algorithm which uses partition keys as input and index values as output, the corresponding relationships between partitions and partition keys further being determined according to a partition mapping table containing the corresponding relationships between the index values and partition numbers.

17. The computer program product of claim 16, the method further comprising:

generating in advance usable partition keys and corresponding index values according to the hash algorithm; and storing the usable partition keys and the corresponding index values in a partition key index value table, and wherein the corresponding relationships between partitions and partition keys in the database partitioning mechanism are determined based on the partition key index value table and the partition mapping table.

18. The computer program product of claim 15, the method further comprising:

in response to determining that the data of a first tenant in a partition needs to be migrated, designating a new partition for the tenant;

modifying the data access status of the first tenant into a first status;

determining a new partition key for the first tenant according to the corresponding relationships between partitions and partition keys in the database partitioning mechanism and the designated new partition;

initiating a transaction to update the value of the partition key field of the data records of the tenant in each database table of the partitioned database system into the new partition key so as to migrate the data of the tenant to the new partition automatically by the partitioned database system according to the new partition key;

in response to a successful completion of the transaction, storing the corresponding relationship between the tenant and the new partition key; and modifying the data access status for the tenant into a second status.

* * * * *